United States Patent
Whitby et al.

(10) Patent No.: US 7,145,603 B2
(45) Date of Patent: *Dec. 5, 2006

(54) DOCKING STATION ASSEMBLY FOR TRANSMITTING DIGITAL FILES

(75) Inventors: Laura R. Whitby, Rochester, NY (US); Lisa W. Jaffe, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/980,368

(22) Filed: Nov. 3, 2004

(65) Prior Publication Data

US 2005/0062883 A1    Mar. 24, 2005

Related U.S. Application Data

(62) Division of application No. 09/874,680, filed on Jun. 5, 2001, now Pat. No. 7,075,579.

(51) Int. Cl.
*H04N 5/225* (2006.01)

(52) U.S. Cl. ............ 348/375; 348/373; 348/376; 348/207.1; 348/207.2

(58) Field of Classification Search .......... None
See application file for complete search history.

(56) References Cited

U.S. PATENT DOCUMENTS

| | | | | |
|---|---|---|---|---|
| 5,459,637 A | * | 10/1995 | Ma et al. | 361/686 |
| 5,528,285 A | * | 6/1996 | Morikawa et al. | 348/14.01 |
| 5,565,756 A | | 10/1996 | Urbish et al. | 320/15 |
| 5,568,198 A | * | 10/1996 | Sakurai et al. | 348/375 |
| 5,656,917 A | | 8/1997 | Theobald | 320/22 |
| 5,717,315 A | | 2/1998 | Maeno et al. | 320/106 |
| 5,734,253 A | * | 3/1998 | Brake et al. | 320/125 |
| 5,768,163 A | * | 6/1998 | Smith, II | 348/373 |
| 5,780,991 A | | 7/1998 | Brake et al. | 320/6 |
| 5,825,155 A | | 10/1998 | Ito et al. | 320/16 |
| 5,870,642 A | * | 2/1999 | Mittelstaedt et al. | 396/428 |
| 5,903,131 A | | 5/1999 | Sekine et al. | 320/106 |
| 6,043,625 A | | 3/2000 | Dowe | 320/106 |
| 6,060,864 A | | 5/2000 | Ito et al. | 320/136 |
| 6,064,176 A | | 5/2000 | Odaka | 320/106 |
| 6,407,914 B1 | * | 6/2002 | Helot | 710/303 |
| 6,721,001 B1 | * | 4/2004 | Berstis | 348/231.6 |
| 7,075,579 B1 | * | 7/2006 | Whitby et al. | 348/575 |
| 2002/0071035 A1 | * | 6/2002 | Sobol | 348/207 |
| 2003/0011702 A1 | * | 1/2003 | Ohmura et al. | 348/375 |

* cited by examiner

*Primary Examiner*—David Ometz
*Assistant Examiner*—Nhan Tran
(74) *Attorney, Agent, or Firm*—Peyton C. Watkins

(57) ABSTRACT

A docking station assembly for transmitting digital images, the docking station assembly comprises a housing for forming an enclosure for the docking station assembly and the housing includes an insert-receiving portion for receiving any of a plurality of removable and replaceable inserts; and a removable and replaceable insert having a docking mating portion which mates with the insert-receiving portion, and having a camera mating portion having a shape of a portion of a particular digital camera.

19 Claims, 4 Drawing Sheets

DOCKING STATION ASSEMBLY FOR TRANSMITTING DIGITAL FILES

CROSS REFERENCE TO RELATED APPLICATIONS

This is a divisional of application Ser. No. U.S. Ser. No. 09/874,680, filed Jun. 5, 2001, now U.S. Pat. No. 7,075,579 entitled A DOCKING STATION ASSEMBLY FOR TRANSMITTING DIGITAL FILES by Laura R. Whitby and Lisa W. Jaffe.

FIELD OF THE INVENTION

The present invention relates to docking stations for digital cameras and, more particularly, to such docking stations having a replaceable insert for permitting docking of a plurality of cameras.

BACKGROUND OF THE INVENTION

Currently known and utilized docking stations for digital cameras include a base portion into which the camera is inserted for downloading images and the like to a personal computer. The docking station further includes an electrical connector which is connected to the personal computer for transmitting the digital images to the computer.

Although the currently known and utilized docking station is satisfactory, it includes drawbacks. Such prior art docking stations only permit one model of camera to be inserted into a particular docking station. Consequently, a user must purchase a new docking station for each camera. Obviously, this is not cost efficient.

Consequently, a need exists for a docking station which permits multiple models of cameras to be inserted therein.

SUMMARY OF THE INVENTION

The present invention is directed to overcoming one or more of the problems set forth above. Briefly summarized, according to one aspect of the present invention, the present invention resides in a docking station assembly for transmitting digital images, the docking station assembly comprising: a) a housing for forming an enclosure for the docking station assembly and said housing includes an insert-receiving portion for receiving any of a plurality of removable and replaceable inserts; and b) a removable and replaceable insert having a docking mating portion which mates with the insert-receiving portion, and having a camera mating portion having a shape of a portion of a particular electronic device.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of permitting a plurality of digital cameras to use a single docking station.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
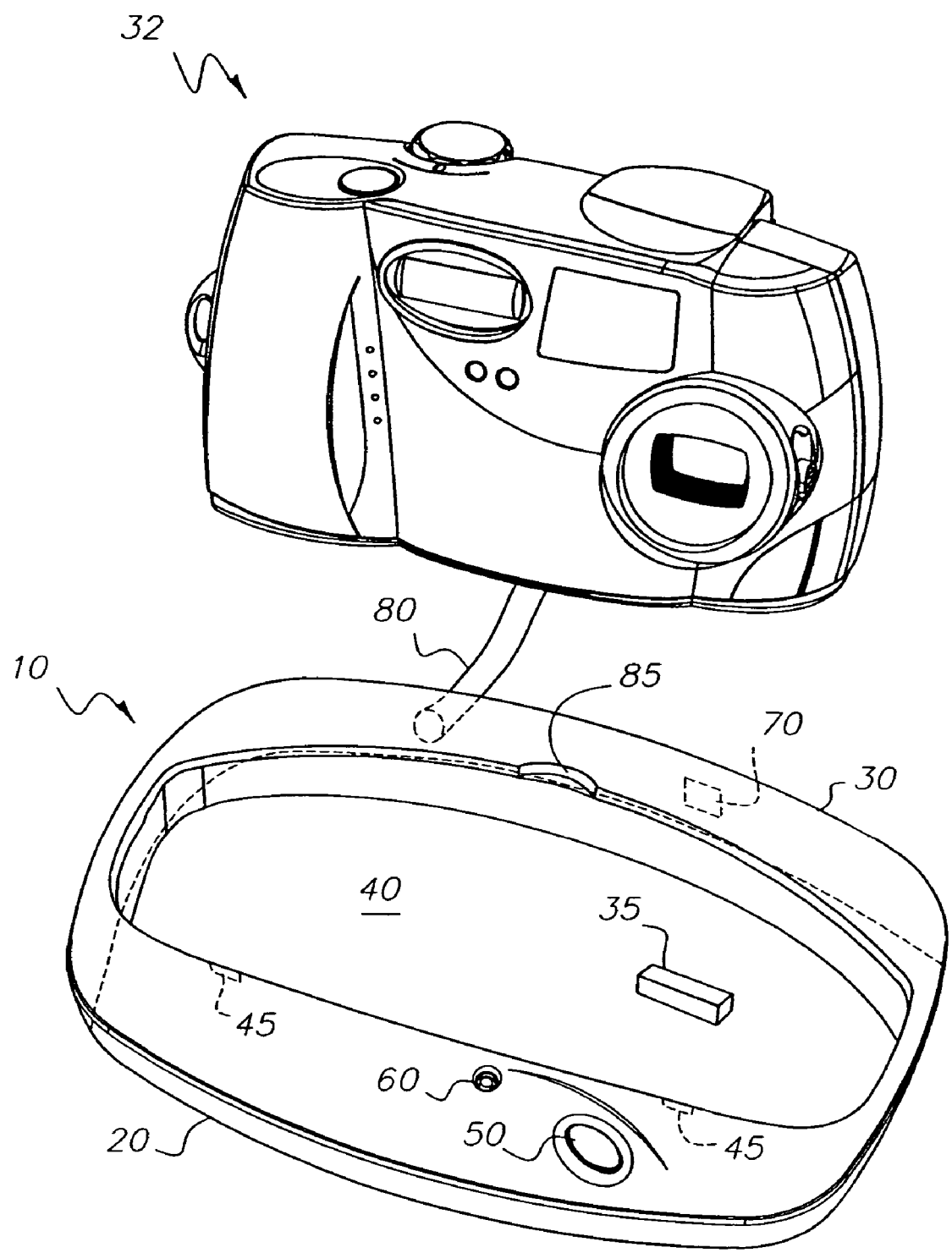
FIG. 1 is a perspective view of a docking station of the present invention.

Referring to FIG. 1, there is shown a docking station 10 of the present invention. The docking station 10 includes a base portion 20 for permitting the docking station 10 to be placed on suitable objects, such as a desk and the like. The docking station 10 further includes an upper enclosing portion 30 attached to the base portion 20 which upper portion 30, in combination with the base portion, forms an enclosure for the docking station 10. As is well-known to those skilled in the art, the docking station 10 includes electronic components in the interior of the enclosure formed by the base 20 and upper enclosing portion 30 for permitting transmission of digital images to a personal computer (not shown). This transmission may be directed by any suitable software program, such as Kodak Picture Software™ available in EasyShare™ products from Eastman Kodak Company, which software may be installed on the personal computer.

The upper enclosing portion 30 includes a notched-out, elongated indentation portion 40 for receiving a replaceable insert (not shown in FIG. 1). It is instructive to note that the indentation portion 40 may receive any of a plurality of inserts, each insert receives a particular digital camera. This permits the docking station to be flexible and cost-efficient in that it can receive a plurality of digital cameras 32. The upper enclosing portion 30 further includes a electrical connector 35 which matingly connects to a portion of the digital camera for permitting electrical signal transmission between the camera 32 and the docking station 10. A finger insert 85 is disposed in the upper portion 30 for permitting insertion of the user's finger for easily removing the insert without any tools. Two recessed portions 45 are also positioned on the upper portion 30 for mating with tabs (described below) for securing fit of the docking station 10 and the insert.

A transmit button 50 is disposed in the upper enclosing portion 30 for permitting a user to initiate transmission of the images by pressing the button 50. A light 60 is included on the upper enclosing portion 30 for indicating charging of the camera. It is instructive to note that charging is automatically initiated upon insertion of the digital camera 32. Such charging techniques are well-known in the art and will not be discussed in detail herein. The base portion 30 also includes an electrical connecting portion 70 for receiving an electrical cable which is connected to the personal computer. A power cable 80 is also attached to the base portion 20 which power cable 80 is connected to an electrical outlet (not shown) for supplying electrical power to the docking station 10.

Figure 2:
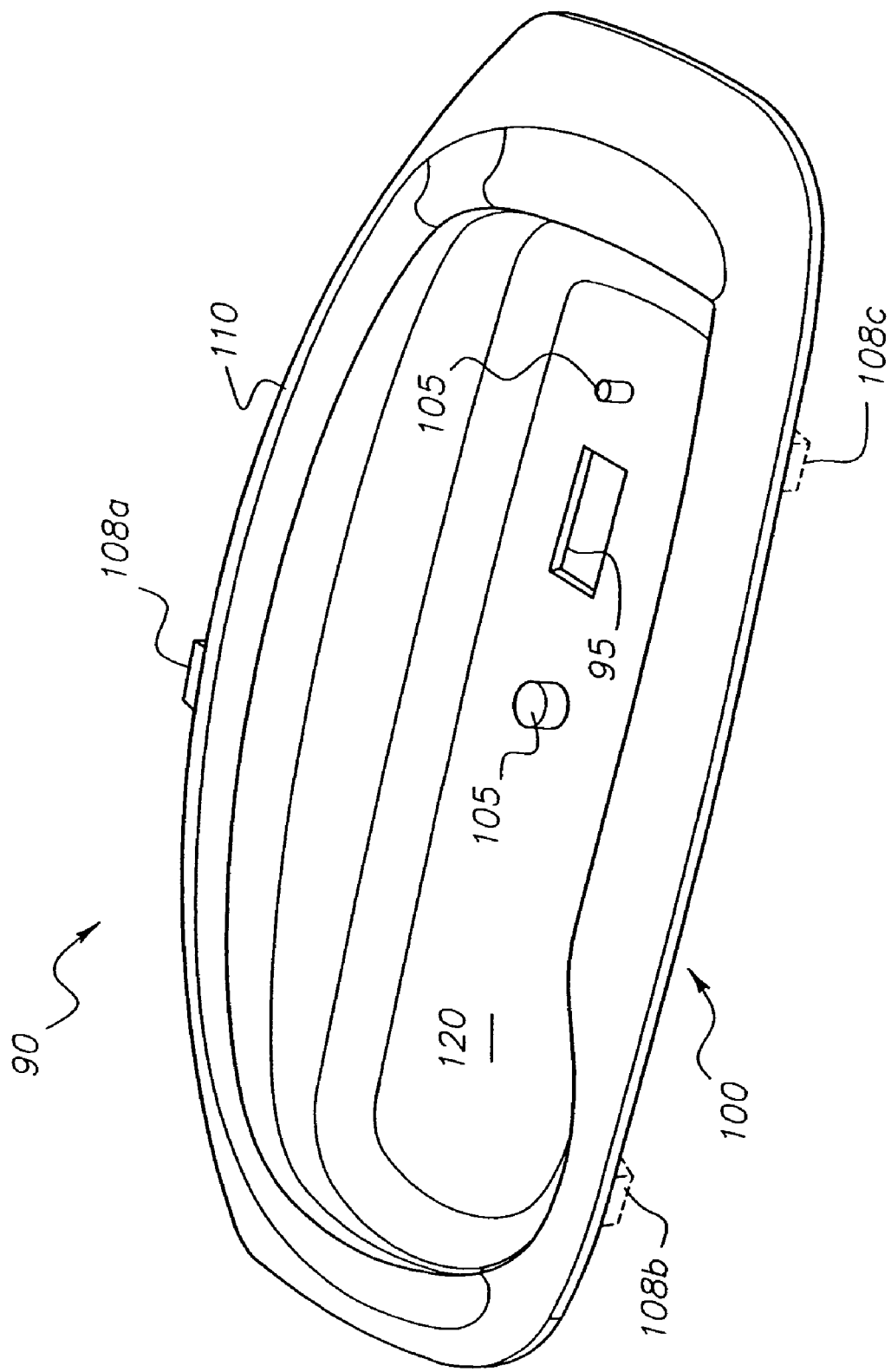
FIG. 2 is a perspective view of an insert of the present invention that is attached to the docking station of FIG. 1.

Referring to FIG. 2, there is shown the replaceable insert 90 of the present invention. The insert 90 includes a bottom portion 100 (not shown in its entirely) having a shape that substantially conforms to the shape of the indentation 40 of the docking station 10 for permitting the insert 90 to be matingly received by the docking station 10. The insert 90 includes an upper portion 110 having a contoured-shape portion 120 which conforms substantially to the shape of a mating portion of the particular camera 32 to which it will be mated. It is instructive to note that the docking station 10 permits a plurality of inserts to be inserted therein all of which mate to the indentation portion 40.

Figure 3:
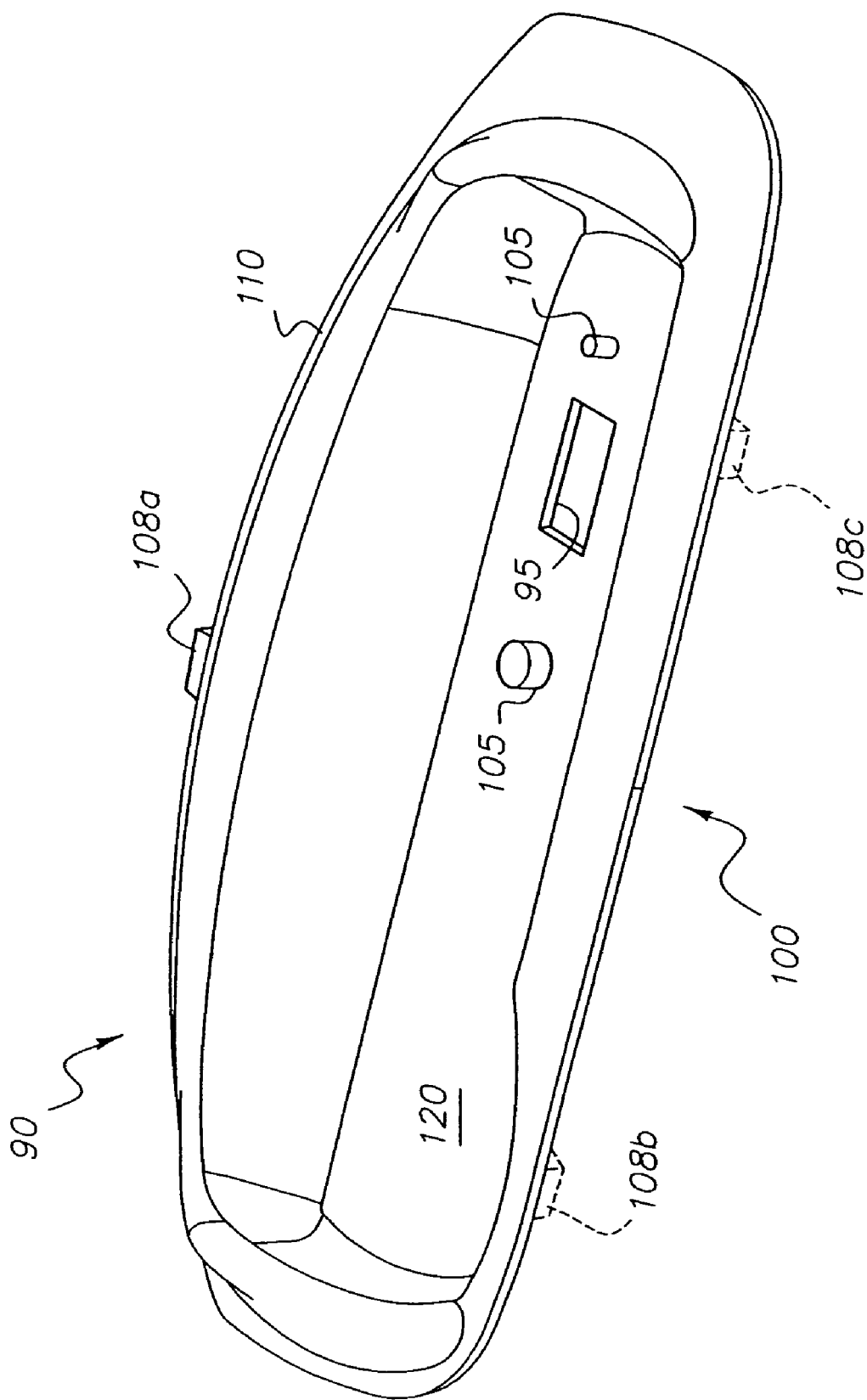
FIG. 3 is a perspective view of a second insert of the present invention that is also attachable to the docking station of FIG. 1.

The insert further includes a cut-away portion 95 for permitting the electrical connection 35 of the docking station 10 to pass therethrough when installed on the docking station 10. Two stabilizing elements 105 are disposed on the floor of the insert 90 for stabilizing the connection of the camera 32 to the insert 90. Positioning tabs 108 are disposed around the peripheral portion of the insert 90 for securing the fit of the insert 90 to the docking station 10. It is instructive to note that the tab 108a mates with the finger inset 85, and the tabs 108b and 108c respectively mate with the recesses 45. The embodiment shown in FIG. 2 is an example of one of the plurality of inserts. FIG. 3 illustrates another example of an insert 90 having the same components as discussed above. It is to be noted, however, that the contoured-shape portion 120 has a different shape from the previously discussed insert 90 for permitting reception of a different camera 32.

Figure 4:
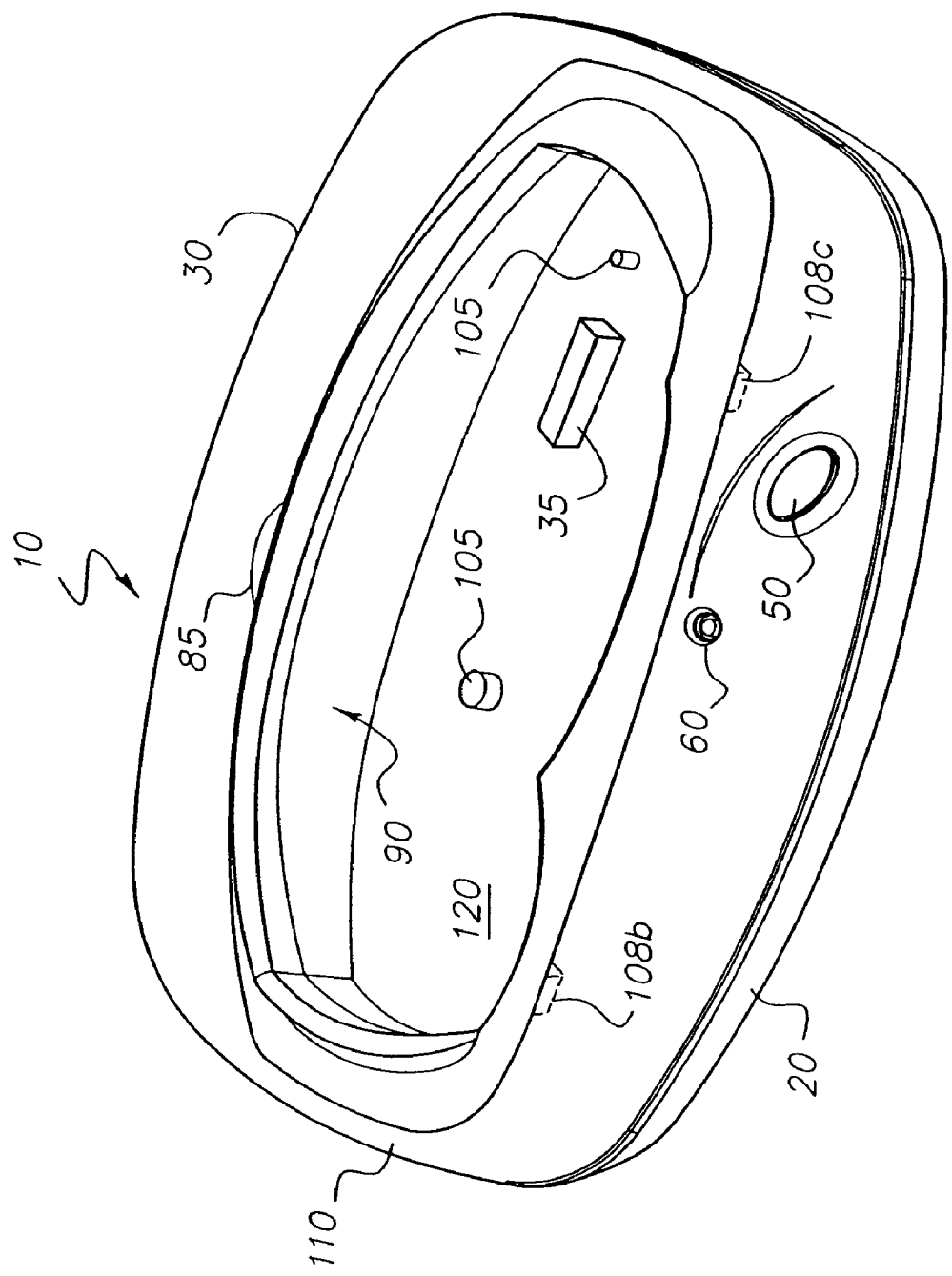
FIG. 4 is a perspective view of the insert installed in the docking station.

Referring to FIG. 4, and for clarity of understanding, there is shown the insert 90 matingly placed in the docking station 10. As is obvious from the illustration, the docking station 10 and insert 90 mate together in an integrated manner.

Although the preferred embodiment illustrates a digital camera, it is instructive to note that multi-media devices, such as MP3™ players, personal digital assistants, or other electronic devices, may be installed in lieu of the digital camera. Still further, wireless devices may also be substituted for the digital camera. In this case, the electrical connection 35 is deleted and substituted with an RF receiver.

The invention has been described with reference to a preferred embodiment. However, it will be appreciated that variations and modifications can be effected by a person of ordinary skill in the art without departing from the scope of the invention.

PARTS LIST

10 DOCKING STATION
20 BASE PORTION
30 UPPER ENCLOSING PORTION
32 DIGITAL CAMERA
35 ELECTRICAL CONNECTOR
40 INDENTATION PORTION
45 RECESSED PORTION
50 TRANSMIT PORTION
60 LIGHT
70 ELECTRICAL CONNECTING PORTION
80 POWER CABLE
85 FINGER INSERT
90 REPLACABLE INSERT
105 STABILIZING ELEMENT
108 TABS
110 UPPER PORTION
120 CONTOURED-SHAPED PORTION

The invention claimed is:

1. A docking station assembly for receiving a digital camera, the docking station assembly comprising:
   a) a base portion for the docking station assembly and said base portion includes an insert-receiving portion for receiving any of a plurality of removable and replaceable inserts; and
   b) a replaceable and manual, one-step removable insert having a docking mating portion on a first side which mates with the insert-receiving portion, and having a digital camera mating portion on a second side having a shape substantially of a portion of the digital camera and which said digital camera mating portion can receive the digital camera.

2. The docking station assembly as in claim 1 further comprising a plurality of removable and replaceable inserts.

3. The docking station assembly as in claim 1, wherein the insert-receiving portion is a notched-out portion.

4. The docking station assembly as in claim 1 further comprising a light indicator for indicating charging of the digital camera.

5. The docking station assembly as in claim 1, wherein the digital camera is wireless.

6. The docking station assembly as in claim 1 further comprising an electrical connection disposed on said base portion for connection to the digital camera.

7. The docking station assembly as in claim 6 further comprising a floor of the insert having a notched-out portion through which the electrical connection passes.

8. The docking station assembly as in claim 7 further comprising one or more stabilizing elements for providing stable support for connection of the digital camera to the insert.

9. The docking station assembly as in claim 1 further comprising an electrical cable attached to said base portion for transmitting digital signals.

10. The docking station assembly as in claim 9 further comprising a power cable attached to said base portion for transmitting electrical power to the docking station assembly.

11. A docking station assembly for receiving a digital camera, the docking station assembly comprising:
    a) a base portion for the docking station assembly and said base portion includes an insert-receiving portion for receiving any of a plurality of removable and replaceable inserts; and
    b) a removable, replaceable, solely mechanical insert having a docking mating portion on a first side which mates with the insert-receiving portion, and having a digital camera mating portion on a second side having a shape substantially of a portion of the digital camera and which said digital camera mating portion can receive the digital camera.

12. The docking station assembly as in claim 11, wherein the insert-receiving portion is a notched-out portion.

13. The docking station assembly as in claim 11 further comprising a light indicator for indicating charging of the digital camera.

14. The docking station assembly as in claim 11, wherein the digital camera is wireless.

15. The docking station assembly as in claim 11 further comprising an electrical connection disposed on the base portion for connection to the digital camera.

16. The docking station assembly as in claim 15 further comprising a floor of the insert having a notched-out portion through which the electrical connection passes.

17. The docking station assembly as in claim 16 further comprising one or more stabilizing elements for providing stable support for connection of the digital camera to the insert.

18. The docking station assembly as in claim 11 further comprising an electrical cable attached to said base portion for transmitting digital signals.

19. The docking station assembly as in claim 18 further comprising a power cable attached to said base portion for transmitting electrical power to the docking station assembly.

* * * * *